(12) United States Patent
Kunamalla et al.

(10) Patent No.: US 11,409,520 B2
(45) Date of Patent: Aug. 9, 2022

(54) CUSTOM TERM UNIFICATION FOR ANALYTICAL USAGE

(71) Applicant: SAP SE, Walldorf (DE)

(72) Inventors: Thirumaleshwar Kunamalla, Warangal (IN); Krishna Hindhupur Vijay Sudheendra, Bangalore (IN); Panish Ramakrishna, Bangalore (IN); Debashis Banerjee, Bengaluru (IN); Hemanth Rajeswari Anantha, Bengalore (IN); Hari Babu Krishnan, Bangalore (IN); Balaji Raghunathan, Bangalore (IN)

(73) Assignee: SAP SE, Walldorf (DE)

( * ) Notice: Subject to any disclaimer, the term of this patent is extended or adjusted under 35 U.S.C. 154(b) by 543 days.

(21) Appl. No.: 16/511,507

(22) Filed: Jul. 15, 2019

(65) Prior Publication Data

US 2021/0019146 A1 Jan. 21, 2021

(51) Int. Cl.
*G06F 8/72* (2018.01)
*G06F 8/41* (2018.01)
*G06K 9/62* (2022.01)

(52) U.S. Cl.
CPC ............... *G06F 8/72* (2013.01); *G06F 8/436* (2013.01); *G06F 8/4434* (2013.01); *G06K 9/6218* (2013.01)

(58) Field of Classification Search
CPC ... G06F 8/72; G06F 8/436; G06F 8/44; G06F 8/34; G06Q 30/0202; G06K 9/6218
See application file for complete search history.

(56) References Cited

U.S. PATENT DOCUMENTS

| | | | | |
|---|---|---|---|---|
| 5,228,123 | A * | 7/1993 | Heckel | G06F 16/748 |
| | | | | 715/835 |
| 2003/0163479 | A1* | 8/2003 | Mathews | G06F 16/289 |
| | | | | 707/999.102 |
| 2004/0143588 | A1* | 7/2004 | Russell | G11C 5/04 |
| 2013/0021369 | A1* | 1/2013 | Denney | H04N 21/43072 |
| | | | | 345/620 |
| 2013/0262756 | A1* | 10/2013 | Goodman | G06F 16/164 |
| | | | | 711/104 |
| 2014/0365533 | A1* | 12/2014 | Debray | G06F 16/2393 |
| | | | | 707/803 |
| 2018/0060684 | A1* | 3/2018 | Ma | G06V 20/63 |
| 2018/0137161 | A1* | 5/2018 | Schwan | G06F 16/215 |
| 2018/0260860 | A1* | 9/2018 | Devanathan | G06F 16/353 |
| 2019/0377713 | A1* | 12/2019 | Lankford | G06F 16/2379 |

* cited by examiner

*Primary Examiner* — Etienne P Leroux
(74) *Attorney, Agent, or Firm* — Buckley, Maschoff & Talwalkar LLC (57) ABSTRACT

A system includes reception of a definition of a first attribute to associate with a logical object of the first application, reception of a definition of a second attribute to associate with a second logical object of the first application, determination, based on the definition of the first attribute and the definition of the second attribute, that the first attribute and the second attribute are associated with a same semantic, based on the determination, generation of e a first identifier associated with the first attribute and the second attribute and storing the first identifier associated with the first attribute and the second attribute in a first data schema associated with the first application, and storage of the first identifier associated with the first attribute and the second attribute in an analytics schema associated with an analytics application.

20 Claims, 11 Drawing Sheets

Transaction Designer

New Item:

Name: ⬚

Description: ⬚

Currency: ⬚

Item Terms

☐ Term                    Reportable Field
─────────────────────────────────────────
☐ Price
☐ Quantity                Quantity
☑ S4-CWP-Term1

[ Add ]  [ Edit ]  [ Delete ]

[ Done ]  [ Cancel ]

Analytical Reporting

Report R123

| Project Name | Item ID | Supplier | Shoe Size | Price |
|---|---|---|---|---|
| ~~~~~~~~~ | ~~~~ | ~~~~~~~~~ | 10 | ~~~~ |
| ~~~~~~~~~ | ~~~~ | ~~~~~~~~~ | 23 | ~~~~ |
| ~~~~~~~~~ | ~~~~ | ~~~~~~~~~ | 40 | ~~~~ |
| ~~~~~~~~~ | ~~~~ | ~~~~~~~~~ | 26 | ~~~~ |
| ~~~~~~~~~ | ~~~~ | ~~~~~~~~~ | 40 | ~~~~ |
| ~~~~~~~~~ | ~~~~ | ~~~~~~~~~ | 26 | ~~~~ |

1010:
- Shoe Number
- Shoe Length
- Shoe Size

CUSTOM TERM UNIFICATION FOR ANALYTICAL USAGE

BACKGROUND

Enterprise software applications provide many types of functionality. Such functionality may utilize built-in logical schemas which represent logical and physical entities of user organizations. Applications typically provide some level of adaptability in view of particular user needs. For example, a user may modify a logical "parts list" object of a user application to include an "origin" attribute which is not present in the built-in logical schema of the application.

An enterprise software application may also provide analytical functions which allow users to run reports, etc. based on data collected during operation of the software application. The analytical functions may utilize analysis-friendly schemas which are also built in to the application. Such analysis-friendly schemas typically do not incorporate users' modifications to the application. With reference to the above example, although the user application may store instances of a parts list object along with data of a user-specified "origin" attribute, this attribute is unusable during data analysis.

Application modifications may also become redundant, particularly in cases where multiple users are able to perform modifications. For example, one user may modify a logical object to include a "Shoe Size" attribute, or term, while another user may modify a different logical object to include a "Shoe Number" term, while yet another user may modify a different logical object to include a "Shoe Length" term. Moreover, each of these three terms may be associated with different properties such as data type (e.g., string, integer and decimal, respectively). Such redundancies create inefficiencies in data storage and application execution, and further complicate analysis of the associated logical objects.

Systems are therefore needed to efficiently support analysis over custom application terms. Systems are also desired to efficiently unify closely-related custom application terms.

DETAILED DESCRIPTION

According to some embodiments, an application user defines a custom attribute, or term, for a logical object and indicates that the term is a global custom term. The global custom term is added to a transaction database schema and is also added to an analytics schema used for data analysis. The global custom term may therefore be used during analysis (e.g., filtering, viewing) of data generated by the application.

Some embodiments provide identification of global custom terms which are associated with similar semantics. Thusly-identified terms may then be associated with a same global identifier. The same global identifier may then be used to perform analysis over the data associated with each of the terms associated with the global identifier. In this regard, embodiments may provide transform(s) to normalize all data associated with a global identifier into a common format.

Some embodiments may therefore provide efficient management, analysis and unification of custom application terms.

Figure 1:
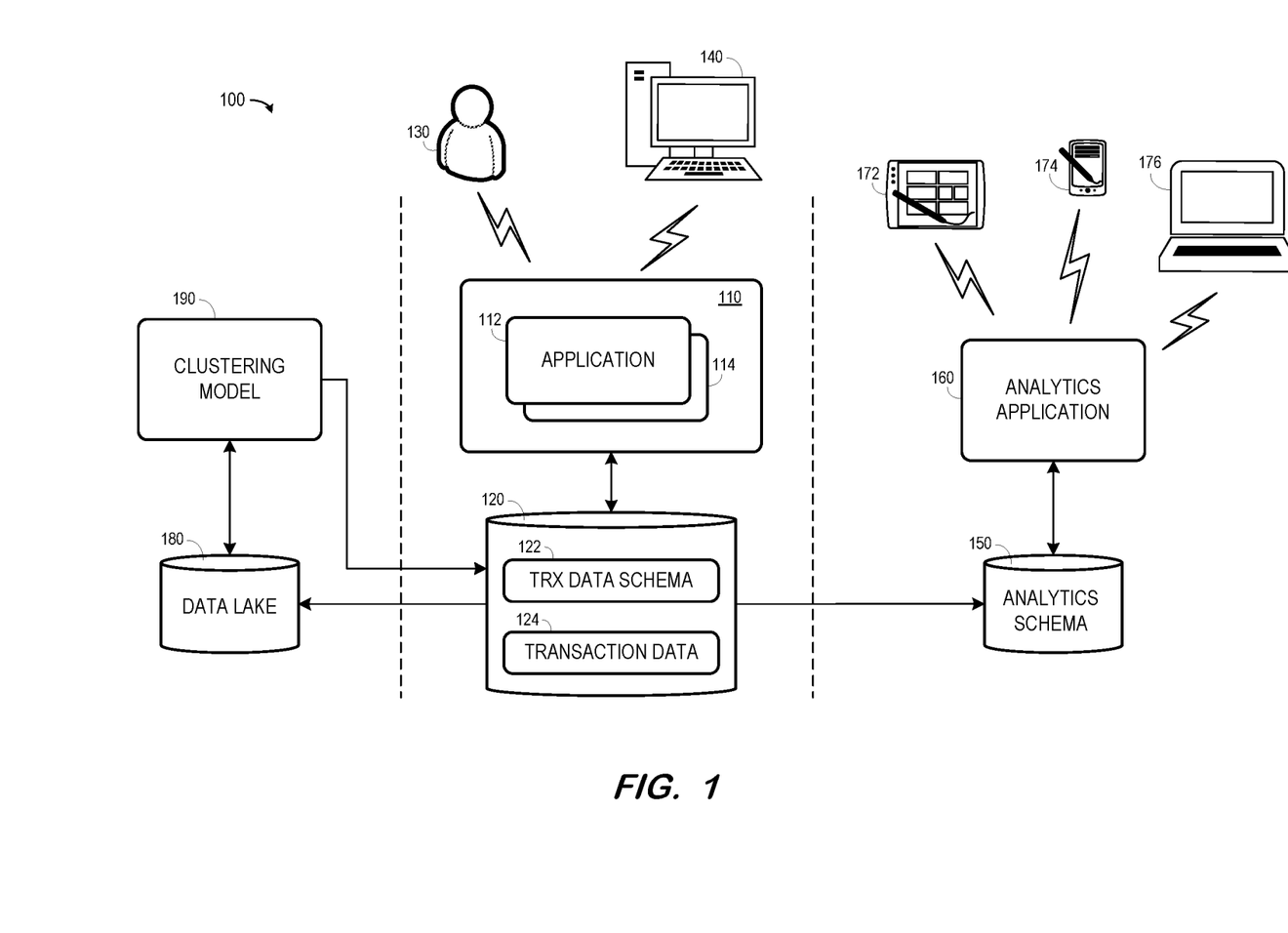
FIG. 1 is a block diagram of a system according to some embodiments.

FIG. 1 is a block diagram of system 100 according to some embodiments. System 100 includes application server 110 and data store 120. Application server 110 may provide an execution platform for applications 112 and 114 as is known in the art. One or more of applications 112 and 114 may execute to collect and serve transactional data to users.

Data store 120 includes metadata of transaction data schema 122 and database tables of transaction data 124. The database tables may store any suitable data related to an enterprise, and the metadata defines the structure and attributes of the data stored therein. The metadata may define a database schema including multiple database tables, logical relationships between the multiple tables, columns and column types of each database table, primary and foreign keys of each database table, and any other attributes. Data store 120 may comprise a distributed architecture and may include any combination of volatile, non-volatile and persistent memory. Data store 120 may be replicated, indexed and backed up in any suitable manner.

According to some examples, administrator 130 provides administrator credentials to application server 110 to access administrator functionality of application 112. Administrator 130 may define custom terms as described herein, each of which may be associated with properties and defined in metadata stored in transaction data schema 122 of data store 120. A user of client device 140 may then interact with application 112 to create, modify and delete instances of logical objects which are associated with the custom terms and stored within transaction data 124 of data store 120.

Administrator 130 and client device 140 may access application server 110 in any suitable manner. In some embodiments, application server 110 is accessed via a client Web browser. Application server 110 may serve Web pages to the Web browser and/or provide client code for execution within a virtual machine of the Web browser to facilitate interaction with applications 112 and/or 114. Application server 110 and data store 120 may be implemented using any client-server architecture that is or becomes known, including but not limited to on-premise, cloud-based and hybrid architectures.

Analytics schema 150 may be populated based on the metadata of transaction data schema 122. For example, a global custom term defined in transaction data schema 122 may be represented by metadata of analysis schema 150, thereby enabling analysis over the global custom term. According to some embodiments, analytics schema 150 may associate two or more global custom terms with a single global identifier indicating that the two or more global custom terms are associated with a similar semantic (e.g., the underlying data of the two or more global custom terms represents a same logical concept). Such similar global custom terms may therefore be considered a "same" term in some analyses and grouping of all the data of each similar global custom term may be desirable for some analyses. Analytics schema 150 may therefore also store data transformation logic associated with one or more of the two or more global custom terms associated with a same global identifier.

Analysis application 160 executes to provide analytical functionality to user devices such as user devices 172, 174 and 176 based on analytics schema 150 and on data retrieved from data store 120. Analysis application 160 and may be executed by application server 110 in some embodiments or within a separate application server. User devices 172, 174 and 176 access analysis application server 160 in any suitable manner.

As will be described in detail below, data lake 180 may comprise a data store to store metadata and data associated with custom terms. This metadata and data may be received from data store 120. Clustering model 190 may use this metadata and data to identify clusters of two or more custom terms which are associated with a similar semantic. Data specifying the identified clusters may be stored in transaction data schema 122 and analytics schema 150, for example in conjunction with a global cluster identifier as described above.

Figure 2:
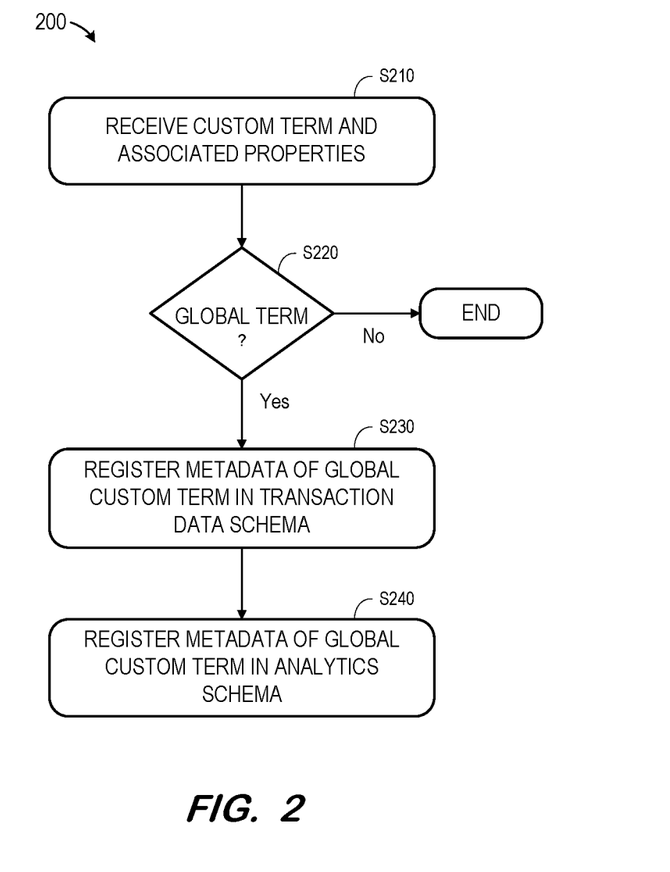
FIG. 2 is a flow diagram of a process to create a global custom term according to some embodiments.

FIG. 2 comprises a flow diagram of process 200 to create a global custom term according to some embodiments. In some embodiments, various hardware elements of system 100 execute program code to perform process 200. Process 200 and all other processes mentioned herein may be embodied in computer-executable program code read from one or more of non-transitory computer-readable media, such as a non-volatile random access memory, a hard disk, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

A custom term and associated properties for an application are initially received at S210. In one example of S210, an administrator of an application accesses administrative user interfaces of the application to input the custom term and associated properties. Access to the user interfaces may proceed over a network such as the Internet as described above.

Creation of the custom term may be an optional aspect of an application workflow in some embodiments. For example, an application workflow may facilitate creation of "line items" within a Request For Proposal, a contract, or the like. Each line item may be associated with properties and, as described above, an administrator may desire to add one or more properties to a particular line item.

Figure 3:
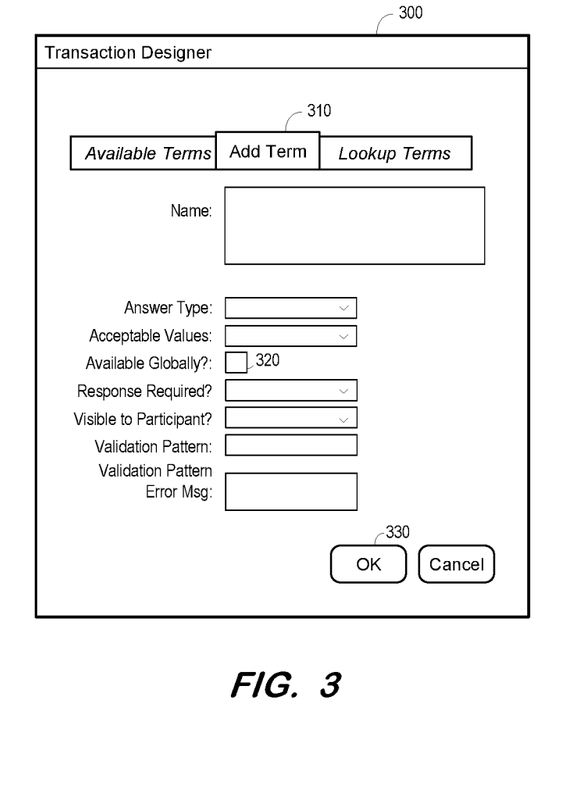
FIG. 3 is a view of a user interface to define a global custom term according to some embodiments.

FIG. 3 is a view of user interface 300 according to some embodiments. User interface 300 provides controls allowing a user to add a custom term to an application. Embodiments are not limited to the particular user interfaces described herein. The application may be executed by a remote application server (or locally), and an administrator may operate a computing device to access the application and to manipulate user interfaces presented on the computing device by the application to navigate to user interface 300.

User interface 300 includes Add Term tab 310, the contents of which are shown in FIG. 3. Add Term tab 310 includes fields for inputting a Name of a custom term and other properties of the custom term including Data Type, Acceptable Values, etc. Tab 310 also includes checkbox 320 to indicate whether the term is to be a global custom term. A global custom term is available to users in all workflows of the application, and not only in the workspace in which the term is being created.

In this regard, an application may provide workspaces in which terms may be used. A workspace may comprise, for example, a single contract including various line items. If a term is being added to a particular workspace using interface 300 and checkbox 320 is not selected, the term is available to users only within the context of the workspace.

Some embodiments provide templates from which one or more workspaces may be instantiated. Continuing the above example, a template may comprise a template of a particular type of contract. If a term is added to a template and checkbox 320 is not selected, the term is available to users within the context of the template and of any workspace instantiated based on the template.

The custom term and associated properties may be received at S210 in response to user selection of OK control 330. At S220, it is determined whether the custom term is intended to be a global term (e.g., was checkbox 320 selected?). If not, process 200 terminates and, for example, the custom term is available within the context of the current workspace/template as described above.

Figure 4:
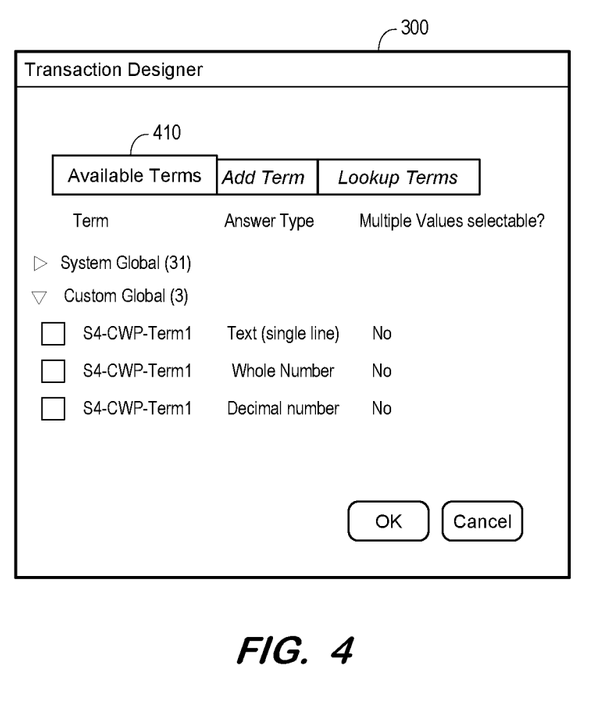
FIG. 4 is a view of a user interface to view global terms according to some embodiments.

Flow proceeds to S230 if the custom term is intended to be a global custom term. At S230, metadata of the global custom term is registered in a transaction data schema. The global custom term may be stored in association with a global identifier. Consequently, the global custom term is available for use in the entire user realm (e.g. all workspaces and templates) of the application. FIG. 4 illustrates user interface 300 displaying Available Terms tab 410. User-created global custom terms are listed under the "Custom Global" heading.

Figure 5:
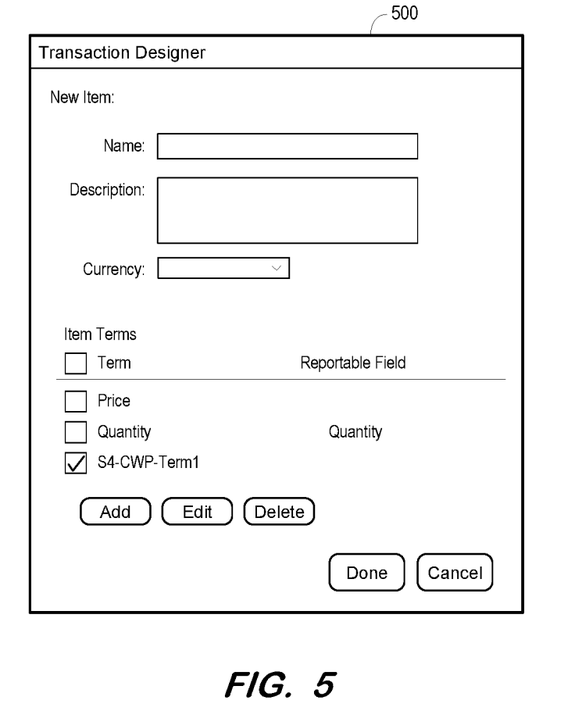
FIG. 5 is a view of a user interface to use a global custom term according to some embodiments.

FIG. 5 illustrates administrator user interface 500 for associating a global custom term with a logical object (e.g., a Line Item) in some embodiments. Selection of the adjacent checkbox and the Add control may result in creation of the custom term as a property of the logical object in the transaction metadata of the application. The custom term may be created as an instance of the global custom term and thereby derive the definitions and properties of the global custom term, including a global identifier of the global custom term.

Metadata of the global custom term is registered in an analytics schema (e.g., a star schema) associated with the application at S240. Registration may be performed by a scheduled job which reviews the transaction data schema to identify new global custom terms and pushes associated metadata to the analytics schema. Such registration allows an analytics application to extract stored transaction data associated with the term and to include the extracted data in analytics.

During execution of the application, transaction data associated with instances of the global custom term may be stored in transaction data tables. Such data may be pushed to an analytics data store in association with the global identifier which is common to all instances, thereby enabling data analysis over the global identifier.

As described above, more than one user may create more than one global custom terms, each of which correspond to a same semantic. Accordingly, it may be beneficial to identify such related custom terms and associate them with a same identifier. The identifier may then be used to analyze the consolidated data associated with each of the related terms.

Figure 6:
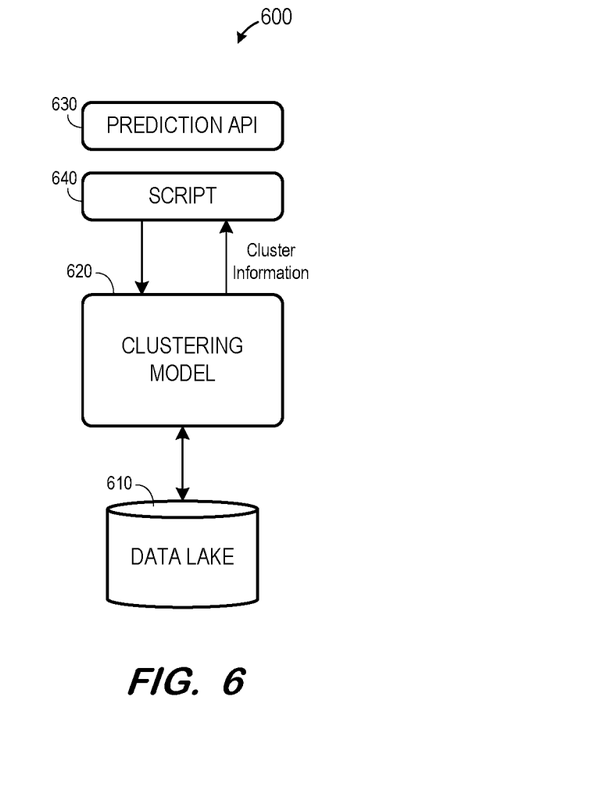
FIG. 6 is a block diagram of a system to identify associated global custom terms according to some embodiments.

FIG. 6 illustrates system 600 to identify related custom terms according to some embodiments. System 600 may comprise an implementation of components 180 and 190 of system 100 but embodiments are not limited thereto.

System 600 includes data lake 610 storing properties of custom terms generated within an application. Data lake 610 may also store transaction data associated with the custom terms. Storage formats other than data lakes formats may be used in some embodiments.

Clustering model 620 may comprise an artificial neural network trained to identify related custom terms. More specifically, clustering model 620 may implement a trained algorithm to generate clusters of related custom terms based on the properties of the global custom terms. Clustering model 620 may be implemented using any one or more suitable neural network models that is or becomes known.

An application such as application 112 may provide data to and receive cluster information from system 600 via prediction application programming interface 630. Script 640 may invoke clustering model 620 and may format corresponding input and output data as needed.

Figure 7:
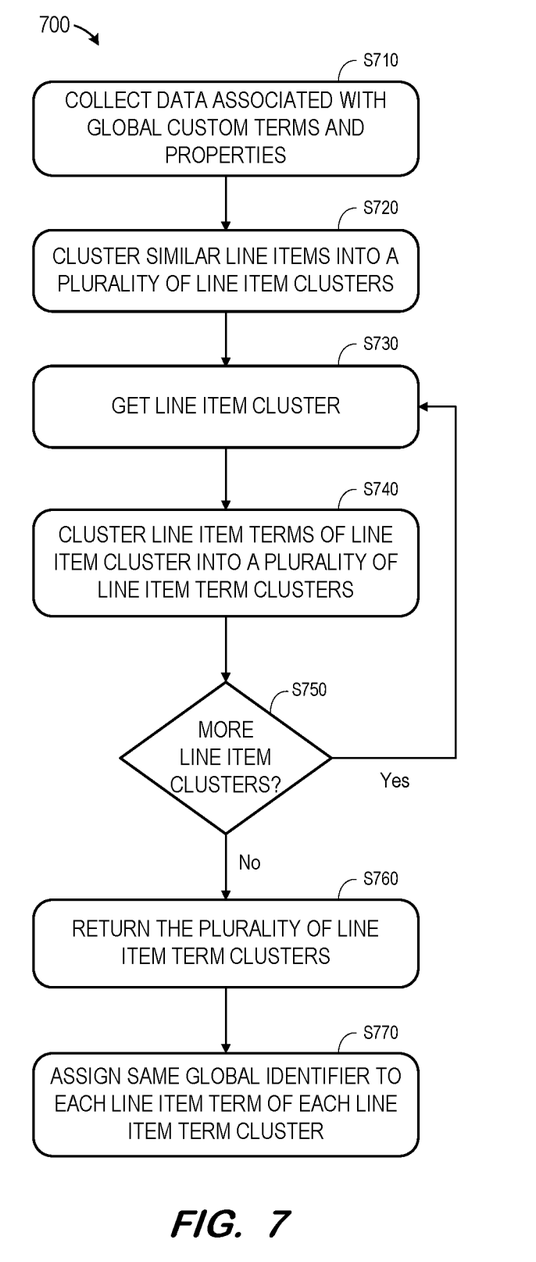
FIG. 7 is a flow diagram of a process to identify associated global custom terms according to some embodiments.

FIG. 7 is a flow diagram of process 700 to identify associated custom terms according to some embodiments. Process 700 may be executed by system 600 but embodiments are not limited thereto. Process 700 may be applied to any terms defined in a transaction data schema, including pre-built (i.e., "out-of-the-box") terms, custom terms and/or global custom terms. The foregoing example will discuss clustering of custom terms, whether or not such a term has been designated as "global" per the above description. Moreover, the logical objects with which the custom terms are associated will be described as line items, but embodiments may be implemented in conjunction with any other logical object including customizable attributes.

Initially, at S710, data associated with custom terms and their properties are collected. The data may include metadata describing the terms and their properties, as well as transaction data associated with the terms. The collected data may also include data associated with the line items associated with each custom term. This latter data may include other (e.g., out-of-the-box) terms associated with the line item object as well as line item instance data (i.e., actual values of the terms for each stored instance). In one example, the data may be collected from transaction data schema 122 and transaction data 124 of data store 120 via prediction application programming interface 630.

Similar line items are clustered into a plurality of line item clusters at S720. Clustering may utilize any suitable unsupervised learning algorithm (e.g., K-means, mean-shift clustering) capable of classifying a set of multi-dimensional data points (i.e., line items and their attributes) into groups having similar properties or features.

Figure 8:
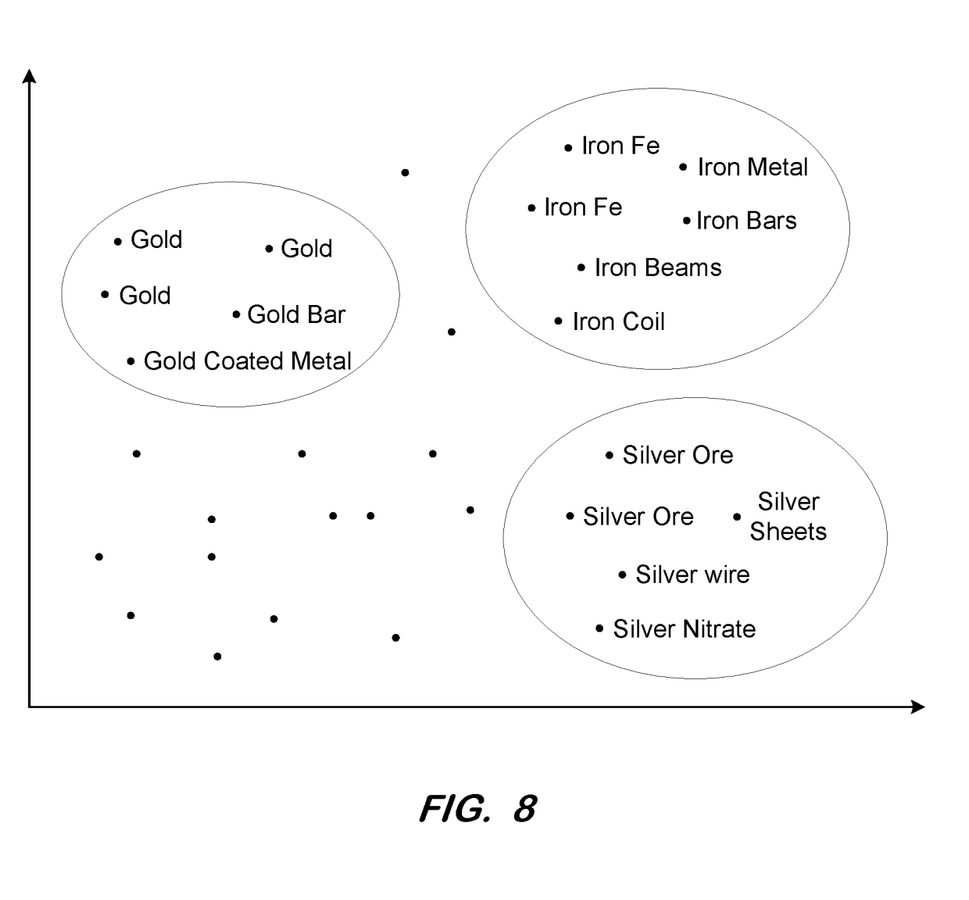
FIG. 8 illustrates clustering of line items according to some embodiments.

According to some embodiments, each line item is initialized with a random centroid location in multi-dimensional space. Next, the line items are grouped into line item clusters based on their attribute values, such as, for example, commodity codes, material Groups, material codes. FIG. 8 illustrates three line item clusters according to some embodiments. As shown, the line items are clustered based on their association with commodity codes of sufficient similarity to one another.

Figure 9:
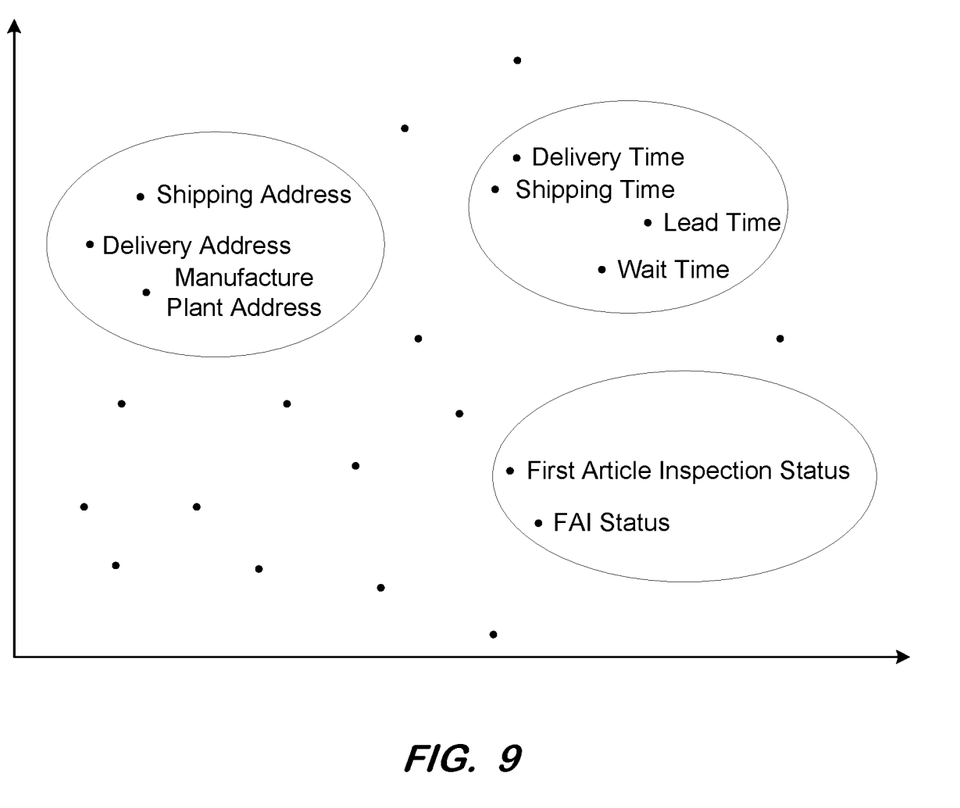
FIG. 9 illustrates clustering of global terms according to some embodiments.

A first one of the plurality of line item clusters is identified at S730. All the terms of each line item in the cluster are analyzed and clustered at S740, into a plurality of line item term clusters. FIG. 9 illustrates three line item term clusters consisting of terms associated with a single line item. Guidelines for a clustering algorithm according to some embodiments are as follows.

Similarly-named line items terms are biased toward nearest centroid locations. Two terms which include an abbreviation and an expanded form of the abbreviation may be considered similarly-named. Line item terms associated with a same data type but not similarly-named are biased toward closest mutual centroid locations. Similar values for line item term instances (e.g., 15 cm, 6 in, 0.5 ft) may also bias the associated line item terms toward closest centroid locations.

Returning to process 700, if it is determined at S750 that additional line item clusters remain to be analyzed, flow returns to S730 to retrieve a next line item cluster. S740 is the re-executed to identify a plurality of line item term clusters of the terms of the next line item cluster. Flow therefore cycles between S730, S740 and S750 until all of the line item clusters have been analyzed.

Next, at S760, the plurality of line item term clusters are returned to the requestor, for example via prediction application programming interface 640. Each term of a given line item term cluster is associated with a same global identifier at S770, for example within transaction data schema 122. As described above, such metadata may be pushed to analytics schema 150 to allow searching, filtering and/or aggregation over all line item terms in a given line item term cluster.

In some embodiments, a term of a given cluster may be associated with a conversion factor which converts data values associated with the term to a common format associated with the cluster. For example, the terms Shoe Size and Shoe Length may be associated with a same term cluster and same cluster identifier. However, a data value associated with the term Shoe Size may be 8.5 while a data value associated with the term Shoe Length may be 13 in. Accordingly, assuming that the measurement unit of the cluster is determined as inches, a conversion factor is also stored for use in converting Shoe Size values to inches.

According to some embodiments, a system administrator or other user reviews the line item term clusters generated by process 700 and approves the clusters prior to reflecting the clusters in transaction data schema 122. For each cluster, the user may accept all terms or a sub-set of the terms as appropriately belonging to the cluster.

Figure 10:
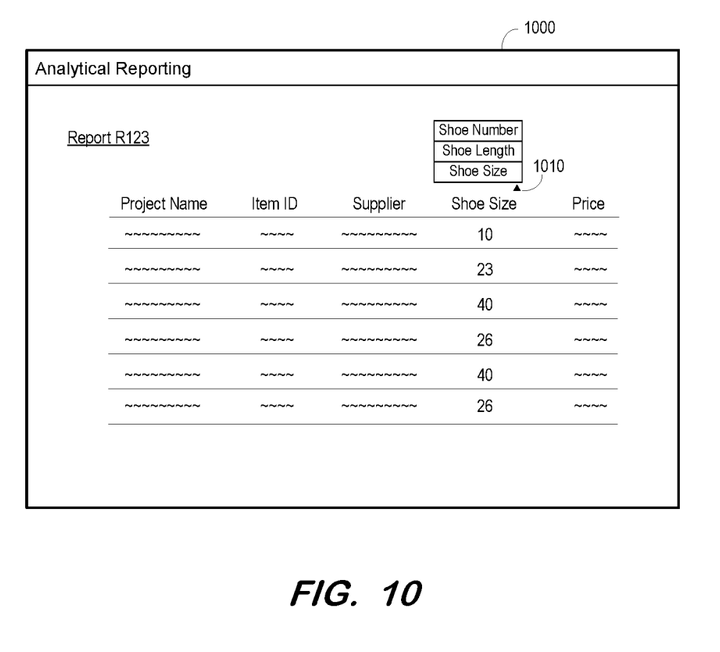
FIG. 10 is a view of an analytical report using unified global custom terms according to some embodiments.

FIG. 10 illustrates analytical report 1000 according to some embodiments. In one example, a user of one of devices 172, 174 or 176 accesses analytical application 160 and requests a report therefrom. The request may specify dimensions, measure and filters for the report as is known in the art. Analytics application 160 generates the requested report based on data and metadata of analytics schema 150. As mentioned above, the metadata of analytics schema 150 may include global identifiers associated with respective line item clusters.

Report 1000 includes the term Shoe Size. According to the present example, Shoe Size is a line item term belonging to a cluster which includes several other line item terms. Each line item term in the cluster is associated with a dedicated identifier as well as a global identifier of the cluster to which it belongs. Therefore, in order to populate the field Shoe Size of report 1000, analytics application 160 retrieves data associated with the Shoe Size term and with all other terms associated with the same global identifier. As displayed in response to selection of expansion control 1010, these other terms include Shoe Number and Shoe Length.

Report 1000 presents the retrieved data for all the terms in the cluster. As mentioned above, data associated with one of the terms may require conversion to a common format prior to generation of report 1000. The conversion may be performed by applying a conversion factor stored along with the cluster metadata.

Figure 11:
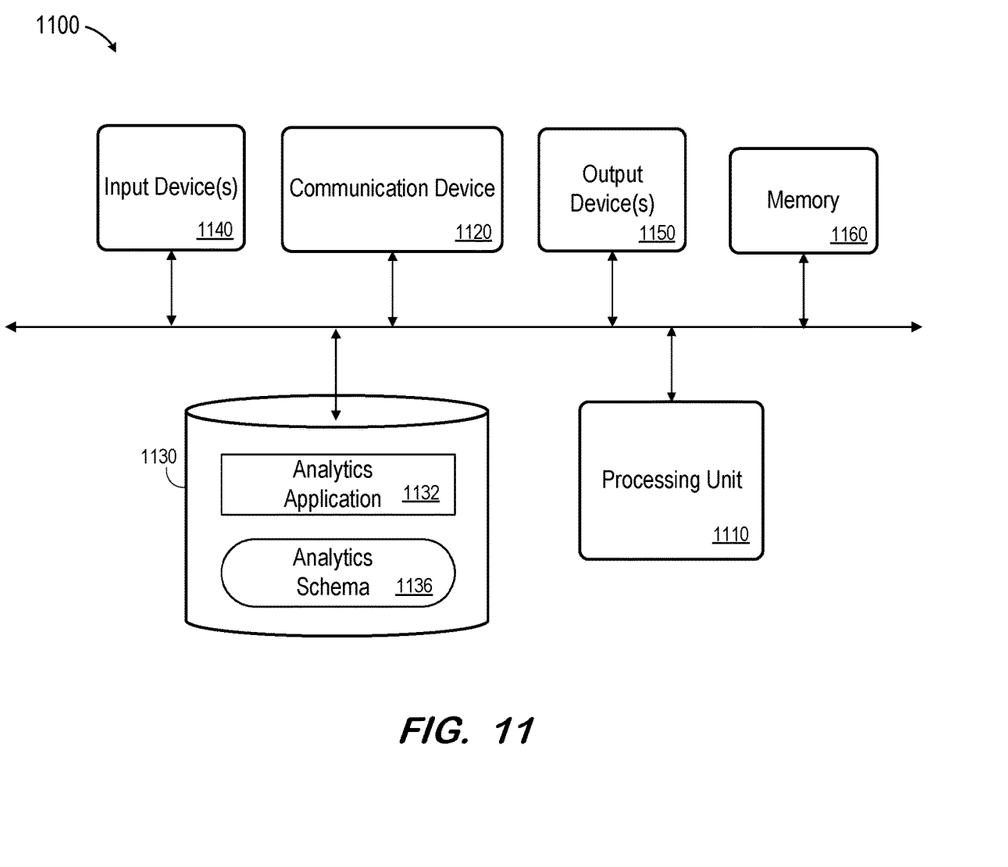
FIG. 11 is a block diagram of a computing system according to some embodiments.

FIG. 11 is a block diagram of apparatus 1100 according to some embodiments. Apparatus 1100 may comprise a general-purpose computing apparatus or computing system and may execute program code to perform any of the functions described herein. Apparatus 1100 may comprise an implementation of an analytics server in some embodiments. Apparatus 1100 may include other unshown elements according to some embodiments.

Apparatus 1100 includes processing unit 1110 operatively coupled to communication device 1120, one or more input devices 1140, one or more output devices 1150, memory 1160, and persistent storage 1170. Communication device 1120 may facilitate communication with external devices, such as a reporting client, or a data storage device. Input device(s) 1140 may comprise, for example, a keyboard, a keypad, a mouse or other pointing device, a microphone, knob or a switch, an infra-red (IR) port, a docking station, and/or a touch screen. Input device(s) 1140 may be used, for example, to enter information into apparatus 1100. Output device(s) 1150 may comprise, for example, a display (e.g., a display screen), a speaker, and/or a printer.

Memory 1160 may comprise Random Access Memory (RAM) and may store code for execution by processing unit 1110. During operation of system 1100, memory 1160 may also store in-memory database tables and metadata defining the structure, properties and dependencies of the database tables.

Persistent storage 1130 may comprise any appropriate persistent storage device, including combinations of magnetic storage devices (e.g., magnetic tape, hard disk drives and flash memory), optical storage devices, and Read Only Memory (ROM) devices. Storage 1130 includes analytics application 1132 comprising program code for providing reports based on global custom terms and/or term clusters in response to requests as described herein. In this regard, storage 1130 also stores analytics schema 1136 including metadata defining the global custom terms and/or term clusters as described herein.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation may include a processor to execute program code such that the computing device operates as described herein.

All systems and processes discussed herein may be embodied in program code stored on one or more non-transitory computer-readable media. Such media may include, for example, a DVD-ROM, a Flash drive, magnetic tape, and solid state Random Access Memory (RAM) or Read Only Memory (ROM) storage units. Embodiments are therefore not limited to any specific combination of hardware and software.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Embodiments described herein are solely for the purpose of illustration. Those in the art will recognize other embodiments may be practiced with modifications and alterations to that described above.

What is claimed is:

1. A system comprising:
   a first storage system storing a first data schema and first data, the first data schema and first data associated with a first application;
   a second storage system storing an analytics schema, the analytics schema associated with an analytics application; and
   an application server to execute the first application to:
   receive, from a first user of the first application, a definition of a first attribute to associate with a logical object of the first application, making the first attribute a first global custom term;
   receive, from a second user of the first application, a definition of a second attribute to associate with a second logical object of the first application, making the second attribute a second global custom term;
   determine, based on the definition of the first attribute and the definition of the second attribute, that the first attribute and the second attribute are associated with a same semantic such that underlying data of the first global custom term and the second global custom term represent a same logical concept;
   based on the determination, generate and store a first identifier associated with the first attribute and the second attribute in the first data schema, wherein data associated with the first identifier is normalized into a common format based on the first identifier; and
   store the first identifier associated with the first attribute and the second attribute in the analytics schema.

2. A system according to claim 1, wherein determination that the first attribute and the second attribute are associated with a same semantic comprises application of a clustering algorithm to data associated with the first attribute and data associated with the second attribute.

3. A system according to claim 2, wherein the data associated with the first attribute comprises properties of the first attribute and data associated with instances of the first attribute, and
   wherein the data associated with the second attribute comprises properties of the second attribute and data associated with instances of the second attribute.

4. A system according to claim 2, wherein the clustering algorithm comprises clustering a plurality of logical objects into a plurality of logical object clusters and, for each of the plurality of logical object clusters, clustering attributes of the logical object of the cluster into a plurality of attribute clusters.

5. A system according to claim 1, wherein determination that the first attribute and the second attribute are associated with a same semantic comprises clustering a plurality of logical objects into a plurality of logical object clusters and, for each of the plurality of logical object clusters, clustering attributes of the logical object of the cluster into a plurality of attribute clusters.

6. A system according to claim 1, the application server further to execute the first application to:
receive a definition of a third attribute to associate with a third logical object of the first application;
receive a definition of a fourth attribute to associate with a fourth logical object of the first application;
determine, based on the definition of the third attribute and the definition of the fourth attribute, that the third attribute and the fourth attribute are associated with a same second semantic;
based on the determination, generate and store a second identifier associated with the third attribute and the fourth attribute in the first data schema; and
store the second identifier associated with the third attribute and the fourth attribute in the analytics schema.

7. A system according to claim 1, the application server further to execute the first application to:
determine a conversion factor associated with the first attribute, the conversion factor to convert a value of the first attribute to a value of the second attribute,
wherein the conversion factor is stored in association with the first attribute in the analytics schema.

8. A computer-implemented method comprising:
receiving a definition of a first attribute to associate with a logical object of a first application, making the first attribute a first global custom term;
receiving a definition of a second attribute to associate with a second logical object of the first application, making the second attribute a second global custom term;
determining, based on the definition of the first attribute and the definition of the second attribute, that the first attribute and the second attribute are associated with a same semantic, such that underlying data of the first global custom term and the second global custom term represent a same logical concept;
based on the determination, generating a first identifier associated with the first attribute and the second attribute and storing the first identifier associated with the first attribute and the second attribute in a first data schema associated with the first application;
storing the first identifier associated with the first attribute and the second attribute in an analytics schema associated with an analytics application; and
normalizing, based on the first identifier, the data associated with the first identifier into a common format.

9. A method according to claim 8, wherein determining that the first attribute and the second attribute are associated with a same semantic comprises application of a clustering algorithm to data associated with the first attribute and data associated with the second attribute.

10. A method according to claim 9, wherein the data associated with the first attribute comprises properties of the first attribute and data associated with instances of the first attribute, and wherein the data associated with the second attribute comprises properties of the second attribute and data associated with instances of the second attribute.

11. A method according to claim 9, wherein the clustering algorithm comprises clustering a plurality of logical objects into a plurality of logical object clusters and, for each of the plurality of logical object clusters, clustering attributes of the logical object of the cluster into a plurality of attribute clusters.

12. A method according to claim 8, wherein determining that the first attribute and the second attribute are associated with a same semantic comprises clustering a plurality of logical objects into a plurality of logical object clusters and, for each of the plurality of logical object clusters, clustering attributes of the logical object of the cluster into a plurality of attribute clusters.

13. A method according to claim 8, further comprising
receiving a definition of a third attribute to associate with a third logical object of the first application;
receiving a definition of a fourth attribute to associate with a fourth logical object of the first application;
determining, based on the definition of the third attribute and the definition of the fourth attribute, that the third attribute and the fourth attribute are associated with a same second semantic;
based on the determination, generating a second identifier associated with the third attribute and the fourth attribute and storing the second identifier associated with the third attribute and the fourth attribute in the first data schema; and
storing the second identifier associated with the third attribute and the fourth attribute in the analytics schema.

14. A method according to claim 8, further comprising:
determining a conversion factor associated with the first attribute, the conversion factor to convert a value of the first attribute to a value of the second attribute,
wherein the conversion factor is stored in association with the first attribute in the analytics schema.

15. A computer-readable medium storing processor-executable process steps which, when executed by a computing device, cause the computing device to:
receive a definition of a first attribute to associate with a logical object of a first application, making the first attribute a first global custom term;
receive a definition of a second attribute to associate with a second logical object of the first application, making the second attribute a second global custom term;
determine, based on the definition of the first attribute and the definition of the second attribute, that the first attribute and the second attribute are associated with a same semantic such that underlying data of the first global custom term and the second global custom term represent a same logical concept;
based on the determination, generate a first identifier associated with the first attribute and the second attribute and storing the first identifier associated with the first attribute and the second attribute in a first data schema associated with the first application; and
store the first identifier associated with the first attribute and the second attribute in an analytics schema associated with an analytics application.

16. A medium according to claim 15, wherein determination that the first attribute and the second attribute are associated with a same semantic comprises application of a clustering algorithm to data associated with the first attribute and data associated with the second attribute.

17. A medium according to claim 16, wherein the data associated with the first attribute comprises properties of the first attribute and data associated with instances of the first attribute, and wherein the data associated with the second attribute comprises properties of the second attribute and data associated with instances of the second attribute.

18. A medium according to claim 17, wherein the clustering algorithm comprises clustering of a plurality of logical objects into a plurality of logical object clusters and, for each of the plurality of logical object clusters, clustering of attributes of the logical object of the cluster into a plurality of attribute clusters.

19. A medium according to claim 15, wherein determination that the first attribute and the second attribute are associated with a same semantic comprises clustering of a plurality of logical objects into a plurality of logical object clusters and, for each of the plurality of logical object clusters, clustering of attributes of the logical object of the cluster into a plurality of attribute clusters.

20. A medium according to claim 15, the processor-executable process steps which, when executed by a computing device, cause the computing device to:

determine a conversion factor associated with the first attribute, the conversion factor to convert a value of the first attribute to a value of the second attribute, wherein the conversion factor is stored in association with the first attribute in the analytics schema.

\* \* \* \* \*